(12) United States Patent
Dompierre et al.

(10) Patent No.: US 6,616,489 B1
(45) Date of Patent: Sep. 9, 2003

(54) WEED-TRIMMER ADAPTED WITH A SCREW OR WATER WHEEL

(76) Inventors: Denis R. Dompierre, 3875 Loton Dr., Fort Gratiot, MI (US) 18059; Timothy Henry Henk, 24523 Hayes, Eastpointe, MI (US) 48021

(*) Notice: Subject to any disclaimer, the term of this patent is extended or adjusted under 35 U.S.C. 154(b) by 0 days.

(21) Appl. No.: 10/120,265

(22) Filed: Apr. 8, 2002

Related U.S. Application Data

(60) Provisional application No. 60/282,505, filed on Apr. 9, 2001.

(51) Int. Cl.$^7$ ............................................. B63H 21/26
(52) U.S. Cl. .................................................... 440/49
(58) Field of Search .................................. 440/900, 49

(56) References Cited

U.S. PATENT DOCUMENTS

| | | | | |
|---|---|---|---|---|
| 4,179,805 A | * | 12/1979 | Yamada | 30/122 |
| 4,505,040 A | * | 3/1985 | Everts | 30/296 R |
| 4,604,067 A | * | 8/1986 | Roberts | 440/49 |
| 4,752,256 A | * | 6/1988 | Dorion | 440/49 |
| 4,976,637 A | * | 12/1990 | Newell et al. | 440/49 |
| 5,083,948 A | * | 1/1992 | Grobson | 440/49 |
| 5,405,277 A | * | 4/1995 | Stalker | 440/49 |

OTHER PUBLICATIONS

Dompierre & Henk, U.S. provisional patent application Ser. No. 60/282,505 filed on Apr. 9, 2001 A.D.

* cited by examiner

*Primary Examiner*—Ed Swinehart
(74) *Attorney, Agent, or Firm*—Christopher John Rudy

(57) ABSTRACT

Motorized weed-trimming device can contain a screw or water-wheel attachment. The screw-adaptation part may be in the form of a grain auger, post-hole digger, drill bit, water-screw, for example, a propeller, and so forth and the like, and the water-wheel may be in the form of a side wheel type paddle water-wheel and so forth and the like. Inboard or outboard styles may be employed for or in combination with watercraft. Preferably, the attachment terminates with the propeller so as to form an outboard motor, say, with the weed-trimming device being gasoline-powered.

9 Claims, 4 Drawing Sheets

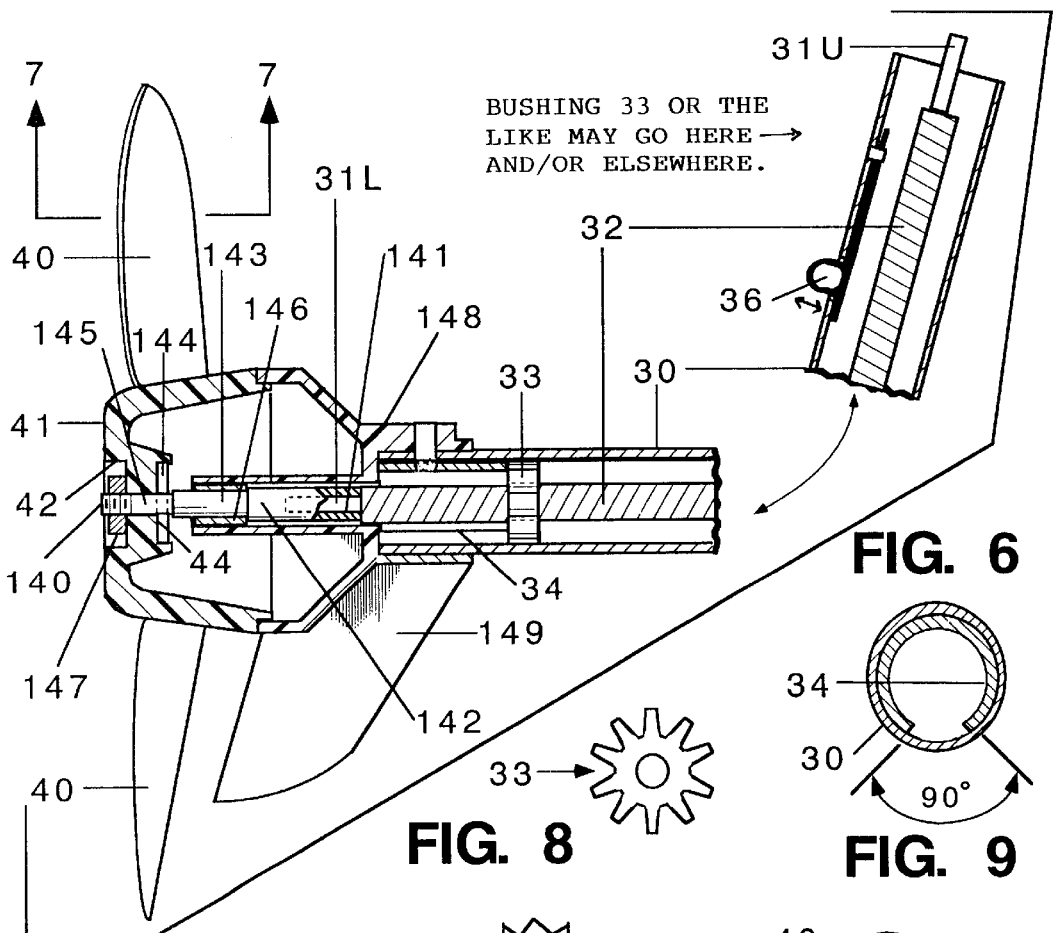
FIG. 6
FIG. 8
FIG. 9
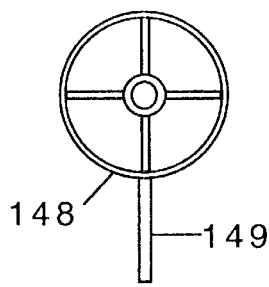
FIG. 7
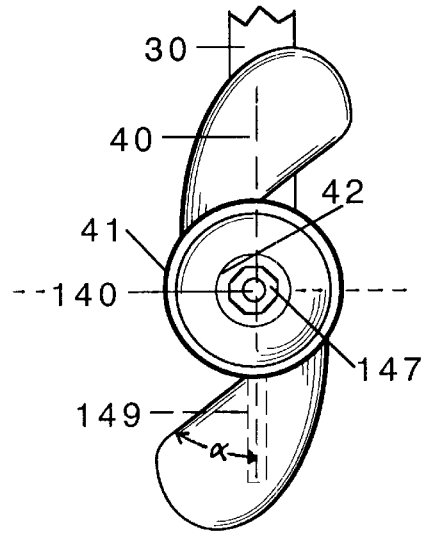
FIG. 10
FIG. 11
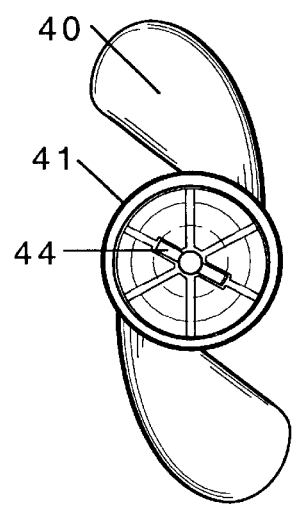
FIG. 12

WEED-TRIMMER ADAPTED WITH A SCREW OR WATER WHEEL

CROSS-REFERENCE CLAIM OF PRIORITY

This claims benefit under 35 USC 119(e) of U.S. provisional patent application No. 60/282,505 filed on Apr. 9, 2001 A.D. The complete specification of that application is incorporated herein by reference.

FIELD AND PURVIEW OF THE INVENTION

The present invention concerns a motorized weed-trimming device adapted to contain a screw or water-wheel. For example, the device can be a string weed-trimmer power plant and shaft, and the screw can be a propeller attached to a distal end of an attachment for the trimmer, which form an outboard motor. Thus, the invention can concern the adaptation attachment itself as well as watercraft with which the outboard motor is combined. The same may be encountered in devices, parts, and methods.

BACKGROUND TO THE INVENTION

The motorized weed-trimmer is a well known, popular, and relatively inexpensive device, which often is a favorite with homeowners and gardeners alike. Certain of these light weight devices are equipped with gasoline-powered engines, some with a two-part drive shaft which can be disassembled so that various attachments other than a string weed-trimmer can be attached and operated by the power plant. For example, bush-cutting saw blades, sidewalk-edgers, rotary soil-tillers, chain saws, and sweepers are known attachments for such devices.

In another field of endeavor, that of recreational boating, there are times that the captain of a small vessel would be advised or desire to have a small outboard motor with him for use in an emergency or, say, as a light duty trolling motor for fishing. However, the typical small outboard can be quite costly, and so, many small watercraft are left without a motor.

SUMMARY OF THE INVENTION

The present invention provides a motorized weed-trimming device adapted to contain a screw or water-wheel. Provided also are said attachment for mounting on and to be powered by the motor of the motorized weed-trimming device; and, in the form of a watercraft motor with water-screw(s)/wheel(s), the combination with the watercraft.

The invention is useful in tool use, desirably in propulsion and movement of goods.

Significantly, by the invention, a light weight and effective device, relatively inexpensive to make and operate, is provided, which can take advantage of an existing motorized tool to mount and power the screw attachment. Accordingly, the versatility of the motorized tool device can be widely increased, and numerous other needs in the art can be supplied. For example, the device can be a string weed-trimmer, and the screw can be a propeller attached to a distal end of an attachment for the weed-trimmer, which form an outboard motor. Thus, the captain of a small vessel, who, for example, is a suburban or cottage homeowner in possession of a string weed-trimming device, finds a beneficial, economically viable solution to his predicament of equipping his watercraft with a small outboard motor. As well, a weed-trimmer manufacturer finds another useful attachment to sell.

Numerous further advantages attend the invention.

DRAWINGS OF THE INVENTION

The drawings form part of the specification hereof. With respect to the drawings, which are not necessarily drawn to scale, the following is briefly noted:

FIG. 1 is a perspective view of the invention of a motorized weed-trimmer device adapted to contain a screw or water-wheel. As the illustration whereof, the motorized device is embodied as a breakdown string weed-trimmer adapted to contain as the screw, here, a propeller. Thus, it can function as an outboard motor.

FIG. 6 is a side view, in partial cross-section, of a propeller-containing attachment of the invention.

FIG. 7 is a cross-sectional view of the propeller found within the attachment of FIG. 6, taken along 7—7 of FIG. 6.

FIG. 8 is an axial view of a cable centering bushing found within the attachment of FIG. 6.

FIG. 9 is an axial view, in cross-section, of a lower tube with inner stop spring found within the attachment of FIG. 6.

FIG. 10 is a rear view of a keel found within the attachment of FIG. 6.

FIG. 11 is a rear view of the attachment of FIG. 6.

FIG. 12 is a front view of the propeller found within the attachment of FIG. 6, i.e., looking from the inside to the out.

ILLUSTRATIVE DETAIL OF THE INVENTION

Figure 1:
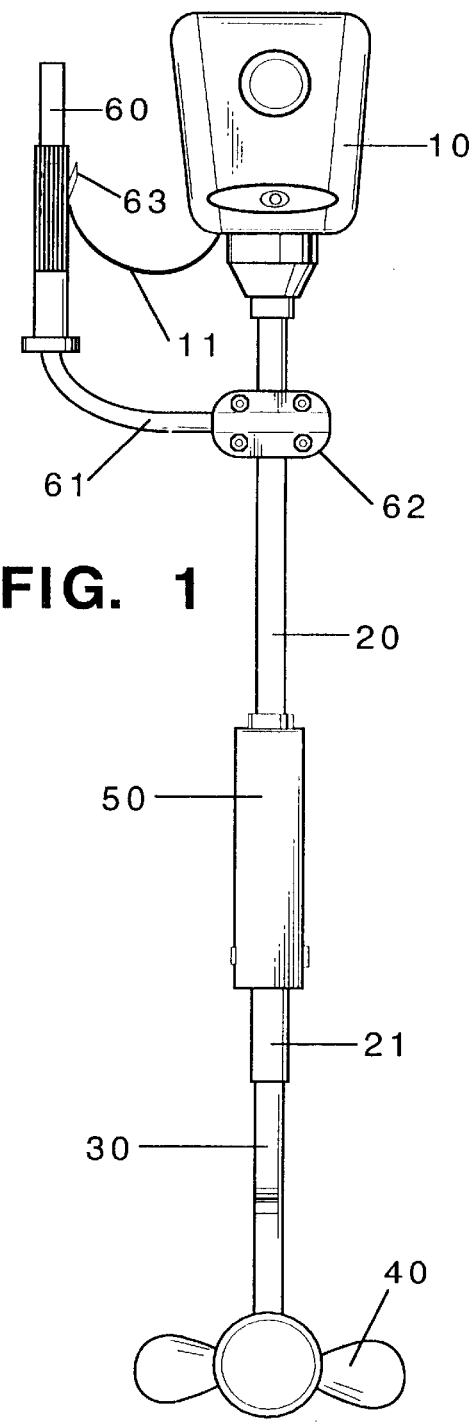

The invention can be further understood through a reading of the present detail, which may be viewed in conjunction with the drawings. The same is to be taken in an illustrative and not necessarily limiting sense.

In general, the present invention resides in a motorized weed-trimming device adapted to contain a screw or water wheel attachment. The part of the weed-trimming device can be supplied by an electric- or gasoline-powered weed-trimmer, and so forth and the like, preferably, for the sake of greater freedom of movement, of the gasoline-powered variety. For example, it may be a basic string-type weed-trimmer power plant and shaft made by any of a host of manufacturers of such devices, say, Ryobi, Model 750r, or another model, or any suitable model, say, manufactured by John Deere, Echo, Homelite, or by another manufacturer. Preferably, the weed-trimmer part is made to be able to receive various adaptations on its drive shaft by replacement such as those known in the art like a string-trimmer head, saw to cut brush, sidewalk-trimmer, rotary soil-tiller, and so forth and the like. Thus, it may be considered to be of the breakdown or reversible type. The part of the screw-adaptation may be in the form of a grain auger, post-hole digger, drill bit, water-screw, for example, a propeller, and so forth and the like, and the water-wheel may be in the form of a side wheel type paddle water-wheel and so forth and the like. Inboard or outboard styles may be employed for or in combination with watercraft. Preferably, the attachment terminates with the propeller so as to form an outboard motor. As the propeller, a plurality of propellers may be employed, to include as a gang or in series. In general, the propeller (or propellers) is (or are) sized and tuned to match the output of the power plant. As a consequence, when of the breakdown or reversible type, the attachment having the screw or water-wheel therewith, useful for mounting on and to be powered by the motor of the motorized weed-trimming device, can be considered to be independently part of the invention.

With reference to the drawings, gasoline-powered string weed-trimmer/outboard 100 may be mounted to boat 9, and can include standard power plant 10 with accelerator control line 11 and upper shaft housing 20 which terminates in distal mid-shaft coupling 21, fastening collar 22 and screw 23. Lower shaft housing 30 with proximal coupling 31 to correspondingly mate and engage the coupling 21 is provided at its distal terminus with a propeller 40. Such a unit may be referred to simply as an attachment. When the upper and lower shafts 20, 30 are coupled, and the power plant 10 is operated so as to drive a drive shaft to include the couplings 21, 31, inside the shaft 20, 30, the propeller 40 rotates. When the propeller 40 is left in the air, provided with the proper pitch and diameter, it can effectively operate as a fan; when the propeller 40 is placed in water, and provided with the proper shape, pitch, and diameter, it can effectively and efficiently operate as an outboard motor.

When particularly embodied as an outboard motor, the device 100 can further contain swivel mount 50 and/or tiller handle 60. The swivel mount 50 can be of any suitable shape or design, and may be made, for one example, from a device akin to or being a plastic fishing rod holder, say, Roberts by Atwood, and so forth to provide housing member 51 that holds tube 52 of an inside diameter greater than the outside diameter of the shaft housing 20 so that the mount 50 can rotatably swivel about the shaft housing 20. Upper stop 53 can be provided by a collar or the like encircling the upper shaft housing 20, and lower stop 54 can be provided by the proximal part of the fastening collar 22. Post 55 for insertion into a corresponding hole provided in the boat 9 can be pivotally mounted to the member 51 through pivot 56. Thus, a pivoting member for mounting to a boat, for example, through its transom, is provided. The tiller handle 60 can be of any suitable shape or design, for example, being made of an L-shaped Aluminum tube 61 mounted to the upper shaft housing 20 by frame and bolt assembly 62. The tiller 60 beneficially mounts accelerator control, say, trigger 63, connected to the accelerator control line 11 to control the speed of the engine 10 turn, the speed of the boat 9.

Figure 2:
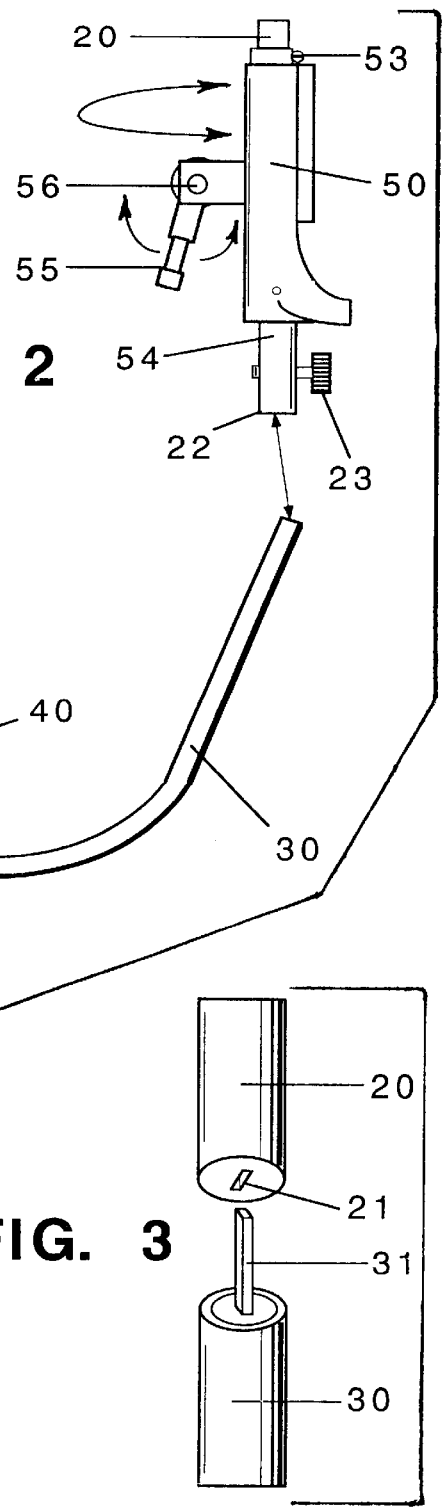
FIG. 2 is an exploded side view of the lower drive assembly of the device of FIG. 1. Also particularly illustrated thereby is a swivel mount adapter for mounting the invention to a boat.
Figure 3:
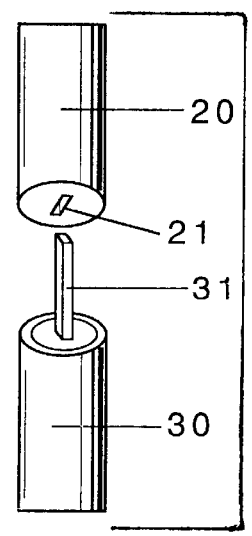
FIG. 3 is an exploded perspective view of the lower drive assembly of the device of FIG. 1. Particularly illustrated thereby is an exemplary drive coupling assembly.
Figure 4:
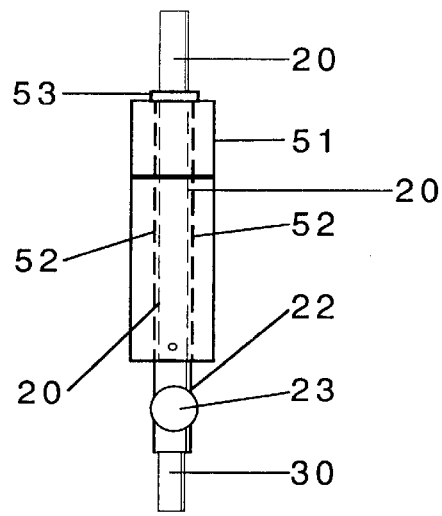
FIG. 4 is a front view of the device of FIG. 1, focusing upon the swivel mount adapter unit.
Figure 5:
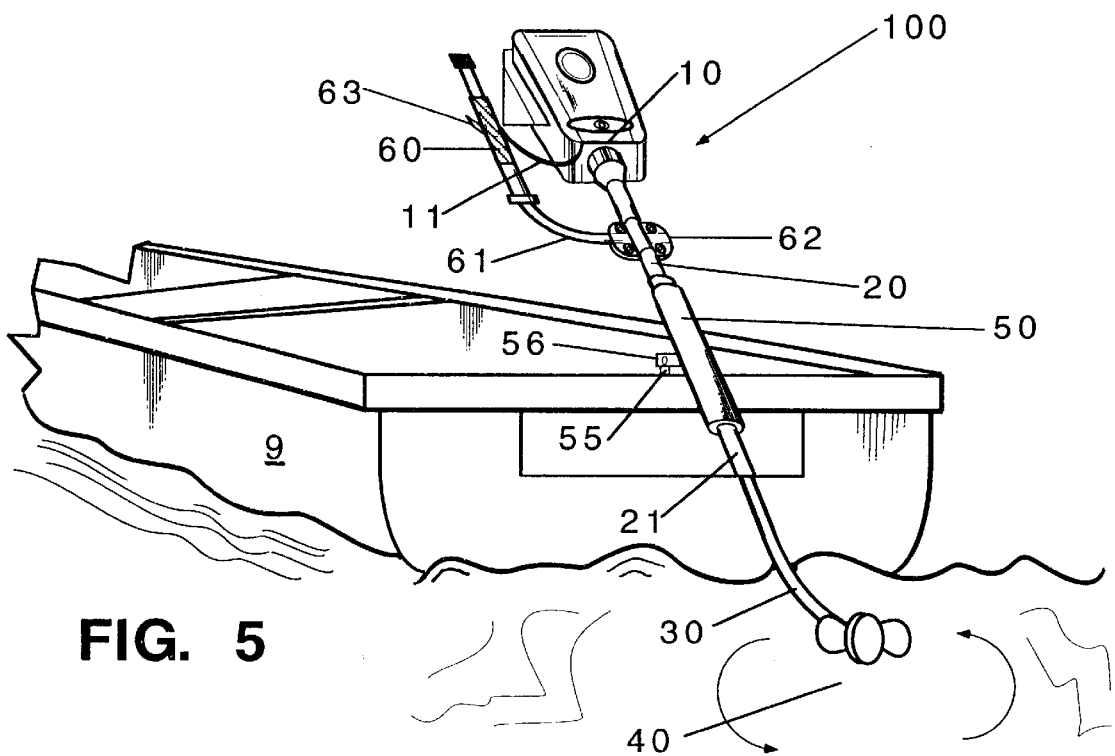
FIG. 5 is a perspective view of the device of FIG. 1 mounted on a small boat.

Compare, FIGS. 1–5.

Figure 13:
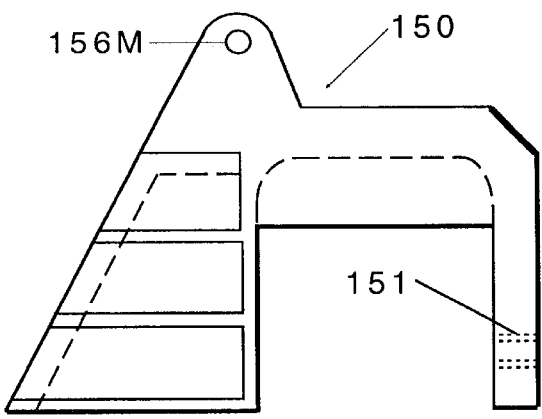
FIG. 13 is a side plan view of a transom mount main body of the invention.
Figure 14:
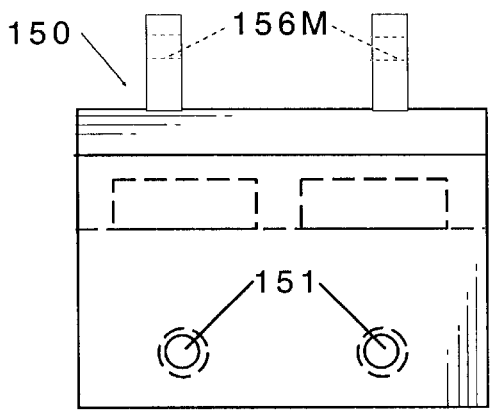
FIG. 14 is a rear plan view of the body of FIG. 13.
Figure 15:
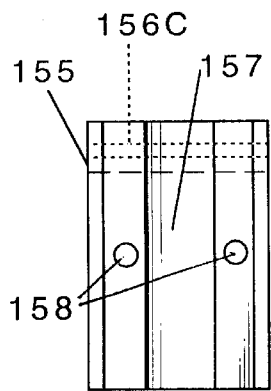
FIG. 15 is a front plan view of a pivot post for pivotal attachment to the body of FIG. 13, and to which a motorized device can be secured in the practice of the invention.
Figure 16:
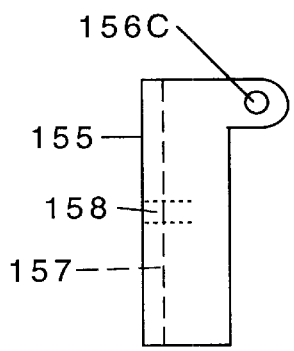
FIG. 16 is a side plan view of the pivot post of FIG. 15.
Figure 17:
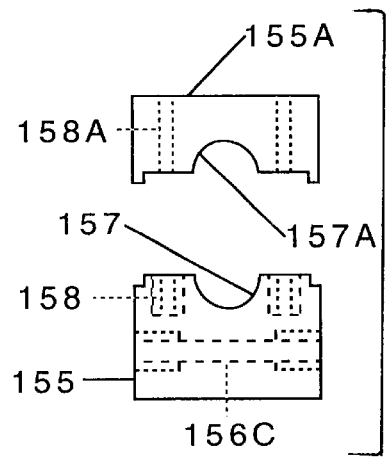
FIG. 17 is a top, exploded plan view of the pivot post of FIG. 15 and an auxiliary cap which can be employed to assist in securing the motorized device with the pivot post and transom mount, to a boat, in the practice of the invention.

A unit as depicted in FIGS. 6–12 and 13–17 can include, in addition to or in lieu of the foregoing, the following features:

| Feature | Comment |
| --- | --- |
| 30 | Lower shaft tube, e.g., with a 1-inch outside diameter, say, of aluminum, stainless steel, etc. |
| 31L | Lower flexible cable coupling, e.g., with an about 1-inch length and a square cross-section. |
| 31U | Upper flexible cable coupling, e.g., with an about 1-inch length and a square cross-section. |
| 32 | Flexible cable (core wire), e.g., with an about 24-inch overall length, including 31L and 31U. |
| 33 | Friction-fitting cable centering bushing, e.g., of molded ultra high molecular weight polyethylene. One or more may be present inside the tube 30, at one point or several points along the cable 32. |
| 34 | Inner stop spring, e.g., of spring steel. |
| 36 | Upper spring attachment fastener. |
| 40 | Propeller, e.g., with a blade tip to blade tip diameter of about 6¾ inches, a blade tip radius of about ¾ of an inch and an about 49-degree angle alpha (α) of the inner blade edge from the normal; say, of nylon, etc. |
| 41 | Propeller core. |
| 42 | Core countersink. |
| 44 | Inside core transfer arm receiving trough. |
| 140 | Transfer shaft, e.g., about ½-inch overall diameter by 3-inch length, say, of #304-stainless steel, etc. |
| 141 | Transfer shaft receptacle for receiving and mating with the lower coupling 31L. |
| 142 | Transfer shaft receiver end body. |
| 143 | Transfer shaft bearing surface. |
| 144 | Transfer arm, for receipt by and mating with the trough 44. |
| 145 | Transfer shaft distal end, with threaded tip. |
| 146 | Bushing bearing to accommodate the surface 143. |
| 147 | Propeller-securing nut. |
| 148 | Keel core, e.g., of nylon, etc., for registering with the propeller core 41 and with hole, for insert of fastener, e.g., screw, post, etc., through it and through a possible hole in the spring 34. |
| 149 | Keel fin. |
| 150 | Transom mount, e.g., of nylon, etc. |
| 151 | Transom mount threaded holes for insert of bolts to secure mount over transom of boat. |
| 155 | Transom mount connectable pivot post. |
| 155A | Auxiliary cap for securing the tube 20 or 30, preferably 20, of the device 100 of the invention. |
| 156C | Transom mount pivot post connection hole for insert of rod, screw, etc., for pivotally connecting the post 156 to the transom mount main body. |
| 156M | Pivot post connection holes in the main body. |
| 157 | Pivot post outboard assembly receiver indent for receiving the tube 20 or 30, preferably 20. |
| 157A | Auxiliary cap receiver indent surface. |
| 158 | Pivot post threaded holes for receiving screw for mounting the cap 155A. |
| 158A | Auxiliary cap borehole for inserting the screw for mounting of the cap 155A to the post 155. |

Among the advantages and benefits of the invention, the attachment can be made to be easy to assemble with no tools needed, as well as being easy to store. In addition, as alluded to previously herein, having the attachment can benefit consumers, and manufacturers and other sellers alike.

CONCLUSION TO THE INVENTION

The present invention is thus provided. Various features, parts, subcombinations or combinations may be practiced with or without reference to other features, parts, subcombinations and combinations in the practice of the invention, and numerous and sundry adaptations and modifications can be effected within its spirit, the literal claim scope of which is particularly pointed out as follows:

We claim:

1. A screw attachment for a weed-trimmer, which comprises a lower shaft housing with a proximal coupling to correspondingly mate and engage a distal mid-shaft coupling of an upper part of a motorized weed-trimming device; and a distal termination with a propeller—such that when coupled, said attachment and the upper part of the motorized weed-trimmer can form an outboard motor for watercraft, and said attachment can be reversibly coupled to the upper part of the motorized weed-trimming device—wherein said attachment further includes a propeller core as part of a propeller-containing attachment, to which the propeller is attached, and within which is a transfer shaft having a transfer shaft receptacle for receiving and mating with a lower coupling to a flexible core wire in the lower shaft housing such that the transfer shaft and a distal portion of the flexible core wire with the lower coupling are mated in an in-line relationship; and a keel core for registering with the propeller core as well as receiving the lower shaft housing.

2. The attachment of claim 1, wherein the lower shaft housing is curved.

3. The attachment of claim 1, wherein a core countersink is present externally in the propeller core; an inside core transfer arm receiving trough is present internally in the propeller core, and opposes the core countersink; a transfer arm is present in the transfer shaft, and is received by said trough; a distal end of the transfer shaft is provided with a threaded tip; a propeller-securing nut is threaded onto the threaded tip of the distal end of the transfer shaft, and received in the core countersink; and a keel fin is attached to the keel core.

4. The attachment of claim 3, wherein the lower shaft housing is curved.

5. An article of manufacture comprising an outboard motor for watercraft, which includes the following:

a part of a motorized weed-trimming device, which includes a power plant in connection with a shaft housing having upper and lower portions with a rotatable weed-trimming device shaft therein that can be rotated by the power plant, and which has a distal termination thereto; and a propeller-containing attachment at the distal termination, which includes a propeller; a propeller core, within which is a transfer shaft having a transfer shaft receptacle for receiving and mating with a lower coupling to a flexible core wire as the rotatable weed-trimming device shaft in the lower portion of the shaft housing such that the transfer shaft and a distal portion of the flexible core wire with the lower coupling are mated in an in-line relationship; and a keel core for registering with the propeller core as well as receiving the lower portion of the shaft housing.

6. The article of claim 5, wherein a core countersink is present externally in the propeller core; an inside core transfer arm receiving trough is present internally in the propeller core, and opposes the core countersink; a transfer arm is present in the transfer shaft, and is received by said trough; a distal end of the transfer shaft is provided with a threaded tip; a propeller-securing nut is threaded onto the threaded tip of the distal end of the transfer shaft, and received in the core countersink; and a keel fin is attached to the keel core.

7. The article of claim 5, wherein the lower portion of the shaft housing is curved.

8. The article of claim 7, wherein the power plant is gasoline-powered.

9. The article of claim 6, wherein the power plant is gasoline-powered, and the lower portion of the shaft housing is curved.

* * * * *